Dec. 1, 1959　　　B. F. RYAN　　　2,915,207
DOLLY-CONVEYOR
Filed Oct. 25, 1957　　　4 Sheets-Sheet 3
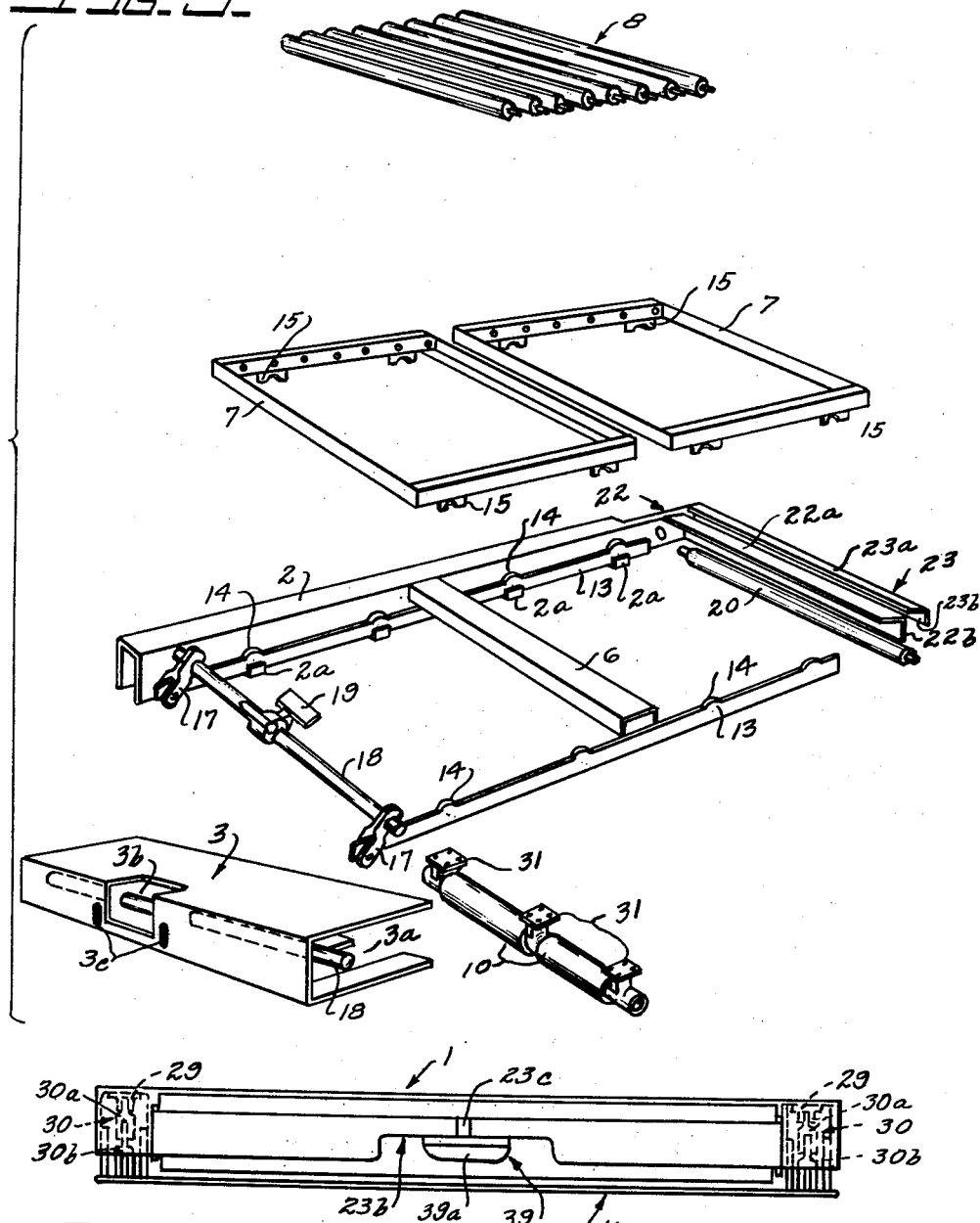
INVENTOR.
BENJAMIN F. RYAN Dec. 1, 1959   B. F. RYAN   2,915,207
DOLLY-CONVEYOR
Filed Oct. 25, 1957   4 Sheets-Sheet 4
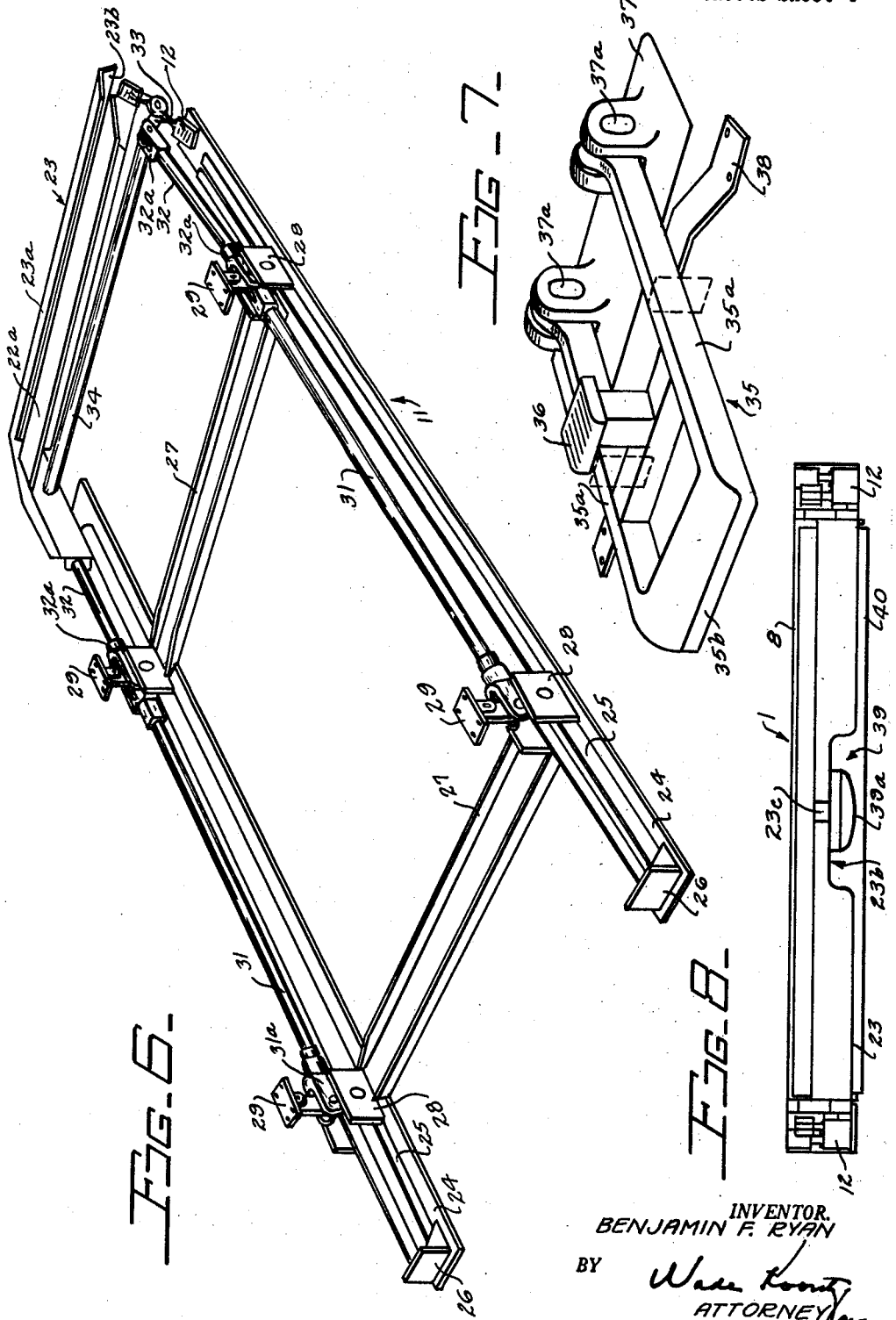
INVENTOR.
BENJAMIN F. RYAN
BY
ATTORNEY
AGENT

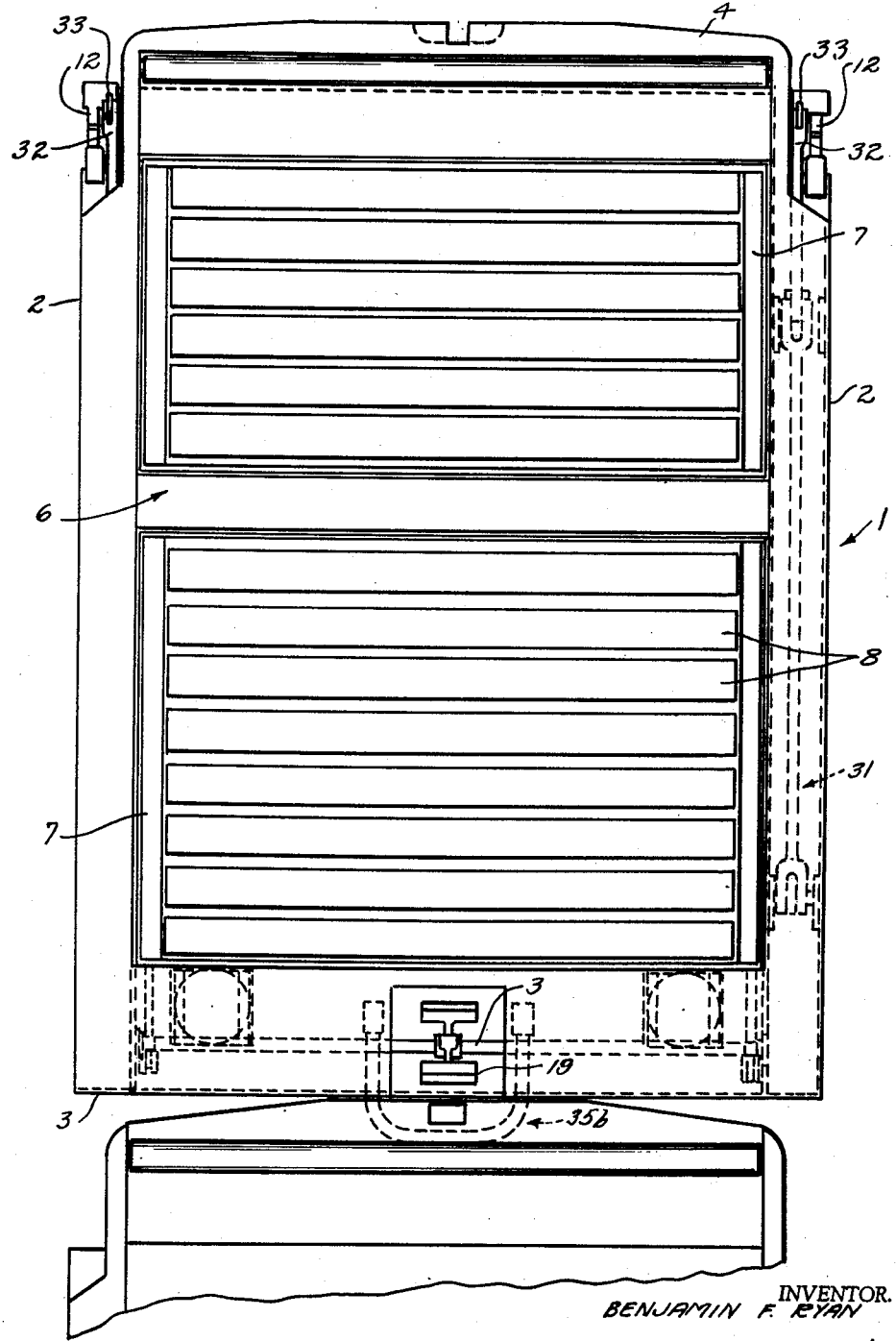

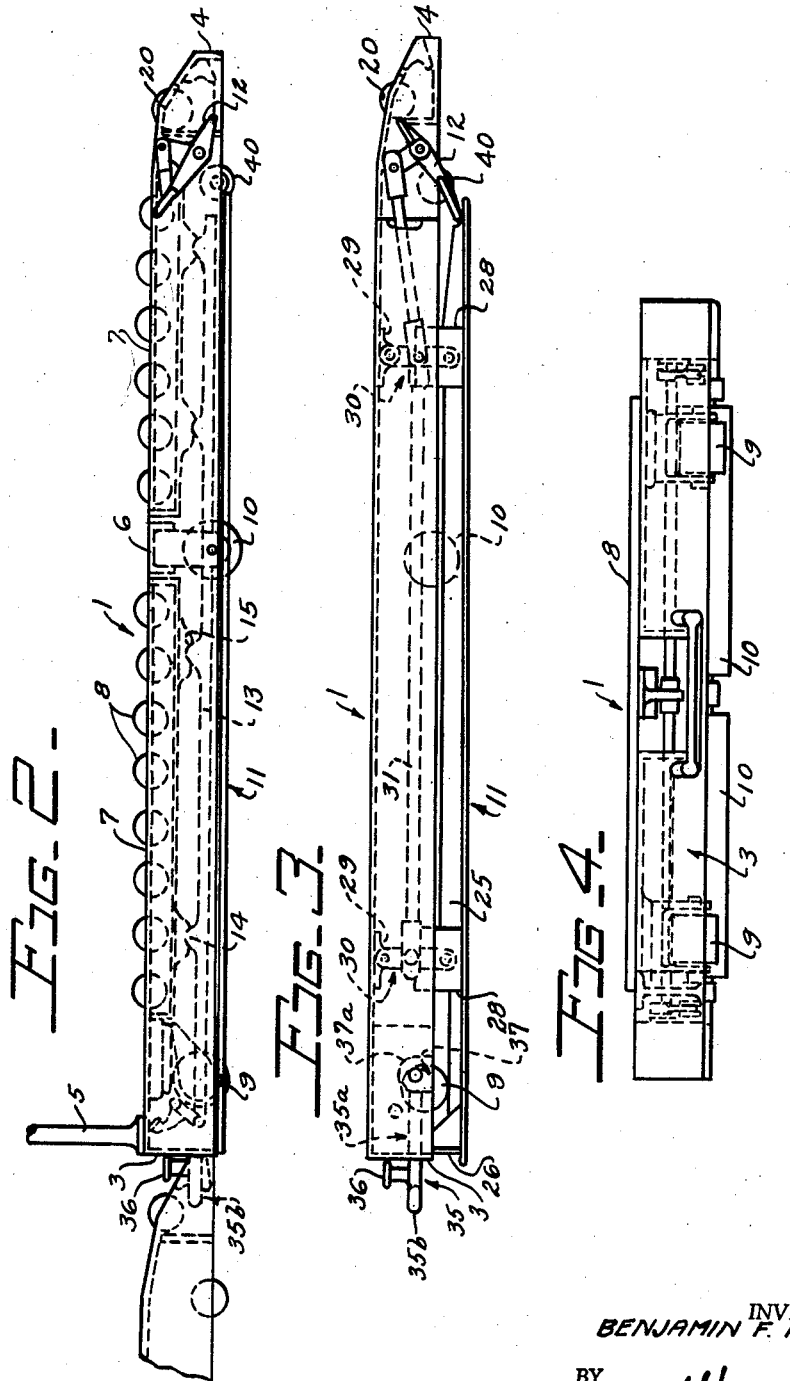

United States Patent Office 2,915,207
Patented Dec. 1, 1959

2,915,207

DOLLY-CONVEYOR

Benjamin F. Ryan, Falls Church, Va., assignor to the United States of America as represented by the Secretary of the Air Force Application October 25, 1957, Serial No. 692,504

5 Claims. (Cl. 214—84)

(Granted under Title 35, U.S. Code (1952), sec. 266)

The invention described herein may be manufactured and used by or for the United States Government for governmental purposes without payment to me of any royalty thereon.

This invention relates generally to mechanism for transporting and/or storing heavy objects and, more particularly, to a device utilizable interchangeably either as a dolly or as a conveyor.

In the use of a building, as for example, a warehouse for the storage of various commodities and other objects, it is frequently necessary to use a dolly to transport the more heavy objects. In addition, the dolly is used in the loading and unloading of trucks, railway cars and aircraft. Generally, a separate conveyor system is also used to expedite the flow of cargo and other material from one point to another. This utilization of two separate systems frequently involves a considerable waste of warehouse space, especially when the separate conveyor system is not in use.

It is an object of the present invention, therefore, to provide an improved dolly for transporting, loading or unloading, and storing various goods.

An additional object of the invention resides in a dolly having an improved means for converting or changing the same from a movable to an immovable carrier and vice versa.

A further object of the invention provides a simple and yet unique system wherein the dolly is easily changeable into a conveyor when it is desired.

A still further object of the invention is in a dolly-conveyor incorporating improved and simplified means for attachment to a second dolly-conveyor.

Another object of the invention resides in the provision of an improved actuating mechanism for selectively converting the device of the present invention into either a dolly or a conveyor.

Other objects and advantages of the invention will become apparent from the following description, taken in connection with the accompanying drawings, in which like reference characters refer to like parts in the several figures.

Fig. 1 is a top view of the dolly utilized in the invention, illustrating a second dolly, partially broken away, connected thereto.

Fig. 2 is a side view of the dolly of Fig. 1, illustrating additional details with both upper and lower rollers in activated position.

Fig. 3 is a second side view of the dolly of Figs. 1 and 2 illustrating details of the activating means for the friction floor bearing mechanism with all rollers inactivated.

Fig. 4 is a rear end view of the dolly of Figs. 1–3, illustrating the condition thereof with both upper and lower rollers activated.

Fig. 5 is an exploded view of the two top roller frames, retracting mechanism, and additional details of the mechanism utilized with the dolly of Figs. 1–4.

Fig. 6 is an enlarged diagrammatic view illustrating details of the retractable friction floor bearing mechanism utilized with the dolly of Figs. 1–5.

Fig. 7 is an enlarged view of the connecting link with foot pedal release utilized to connect the dolly of the instant invention with a second dolly.

Fig. 8 is a front end view of the dolly utilized in the invention, illustrating the lower rollers only in activated position and showing additional details of the connecting means utilized with the connecting link of Fig. 7.

Fig. 9 is a second front end view as in Fig. 8 illustrating additional details of the activating means for the friction floor bearing mechanism of Fig. 6.

Referring particularly to Figs. 1, 2 and 4 of the drawings, the dolly of the instant invention is indicated generally at 1 and consists of a generally rectangular open frame having a pair of side walls 2, a rear end 3, a front end 4 and an upright handle 5. Positioned at an intermediate location is a main brace or top support element 6 extending between side walls 2. In the open space on each side of said top support element 6 is positioned a top roller frame 7 in which frames 7 are mounted a plurality of top rollers 8. Said top rollers 8 are actuated between an exposed position and a recessed position by mechanism to be described hereinafter in detail with specific reference to Fig. 5 of the drawings. In addition to said plurality of top rollers 8, the dolly 1 of the present invention incorporates bottom rollers 10 and 40 and swivel casters indicated at 9 which provide the main support for dolly 1 when in the activated position. As seen clearly in Fig. 4 of the drawings, swivel casters 9 are relatively short and are mounted in a pair substantially adjacent opposite sides of and depending from the rear end 3 of said open frame. Said bottom rollers 10 are mounted as a pair in depending relation from said main brace or top support element 6 by means of three brackets 31 as seen clearly in Fig. 5 of the drawings. When it is desired to inactivate bottom rollers 10 and 40, retractable friction floor bearing mechanism indicated generally at 11 in Fig. 2 and shown in detail in Fig. 6 of the drawings is moved to its lowermost position by actuation of either operating pedal 12. A pair of said operating pedals 12 is shown on either side of said dolly 1 adjacent the front end 4 thereof in exposed condition because of the cutaway portion on the forward end of each side wall 2. The details and the operation of said retractable friction floor bearing mechanism 11 will be described hereinafter with specific reference to Fig. 6 of the drawings.

With particular reference to Fig. 5 of the drawings, it is clearly seen that side walls 2 (only one of which is shown) are U-shaped in cross section with the open end of the U facing towards the bottom of said dolly 1. On the inside wall of each side wall 2 are rigidly positioned a plurality of U-shaped brackets 2a spaced at specified intervals along the bottom edge thereof for a purpose to be explained hereinafter. An elongated operating member 13 is releasably mounted in said plurality of brackets 2a on each side wall 2 in their lowermost position. Said operating member 13 incorporates a plurality of upstanding projections 14 along the upper surface thereof, which projections 14 engage in a plurality of depending, complementary cutout surfaces or indentations 15 incorporated on the lower surface of top roller frames 7. Each operating member 13 incorporates a hole or opening on the rear end thereof, which opening is pivotally engaged with the lower end of a connecting link 17. As clearly seen in said Fig. 5, the upper end of said connecting links 17 are rigidly attached to opposite ends of an operating bar 18, which operating bar 18 is pivotally affixed at each end to the inside of side walls 2. A pedal 19 is affixed to said bar 18 for the purpose of actuating the same to raise and lower top rollers 8 in a manner to be explained hereinafter. Said operating bar 18 is supported as shown in the rear end 3 of said dolly 1. Said rear end 3 consists of a U-shaped section with the open end thereof facing towards the front end 4 and includes a cutout portion 3a on the bottom adjacent each end thereof which cutout portion 3a provides the necessary space for the operation of the connecting link 17 and operating member 13 previously described for activating top rollers 8. In addition, said rear end 3 has a second opening 3b cut out therefrom to provide operating space for the pedal 19 which pedal 19 is affixed to said operating bar 18 as previously stated. Moreover, said rear end 3 incorporates two relatively elongated slots 3c on the rear end thereof, the purpose of which will be hereinafter described with reference to Fig. 7 of the drawings. In addition to the upper or top rollers 8, another top roller 20 is mounted adjacent the forward or front end 4 of said dolly 1. Said top roller 20 is permanently and rotatably affixed in openings on the inside of each side wall 2 to facilitate the loading and unloading of heavy objects on dolly 1. The front end 4 further includes a top support element 22 incorporated therein in flush relation with side walls 2 and including a flat top surface 22a and a depending portion 22b and a front nose element 23 having a flat upper surface 23a and extending downwardly at an angle towards the front end and terminating in a second depending portion 23b. With this arrangement, the top roller 20 is positioned between said top support element 22 and front nose element 23 with its upper surface in exposed position to provide rolling support to any object being loaded or unloaded from said dolly 1. As illustrated in the drawings, there are a total of eight top rollers 8 supported in one of said frames 7 and a total of six in the other of said frames 7. It is noted, however, that the specific number of rollers illustrated is for convenience only and that any number desired may be utilized without departing from the spirit or scope of the invention.

With specific reference to Figs. 3, 6 and 9 of the drawings, the retractable friction floor bearing mechanism 11 consists of a pair of parallel main support elongated base members 24 that are flat on their bottom surface and incorporate a pair of elongated guide strips 25 on their upper surface. On the rear end of said guide strips 25, a block 26 having a flat end surface is incorporated. A pair of channel-shaped cross braces 27 are affixed between and at right angles to said base members 23. A pair of upright supports 28 are affixed on each side of guide strips 25 on said base member 24 opposite each end of said pair of cross braces 27. Said retractable friction floor bearing mechanism 11 is supported on dolly 1 by means of a plurality of pairs of brackets 29 affixed to the inside surface of each side wall 2. Pivotally attached to each of said supporting brackets 29 is a double clevis-type linkage indicated generally at 30 and consisting of links 30a and 30b pivoted to each other and to the base member 24. Said linkage 30 is actuated by means to be described hereinafter between a rigid, straight-line supporting position and a collapsed, nonsupporting position. In effect, therefore, said linkage 30a, 30b constitutes a "break-type" linkage when actuated between its supporting and nonsupporting positions. The means for actuating said "break-type" linkages 30a, 30b consists of a main operating rod 31 extending between each pair of brackets 29. Said main operating rod 31 is pivotally attached by means of a clevis 31a at each end to the pivot between links 30a and 30b of double clevis linkage 30 and is actuated or translated towards the rear end of friction floor bearing mechanism 11 by means of the actuating rod 32 positioned in the forward portion of floor bearing mechanism 11 on opposite sides thereof. Said actuating rod 32 incorporates a clevis 32a on each end thereof with the rear end clevis 32a surrounding and pivotally engaged with clevis 31a on the forward end of main operating rod 31. On the opposite or forward end of each actuating rod 32, clevis 32a is pivotally engaged with one end of a relatively short link 33 which link 33 is rigidly engaged at its opposite end to the pivot of the foot pedal 12. As seen clearly in Fig. 1 of the drawings, there are two of said foot pedals 12 rigidly mounted on the opposite ends of a connecting bar 34 (see Fig. 6) to enable simultaneous operation of the pair of "break-type" linkages 30a, 30b positioned on each side of base member 24 as previously described. With this arrangement, both main operating rods 31 may be actuated together as a complete unit on actuation of either foot pedal 12. Initially, on pressure being applied to rotate either of said foot pedals 12, the forward end of actuating rod 32 is pivoted upwardly from its normally horizontal position through its connection thereto by short link 33 and, at the same time, is translated rearwardly applying pressure on the forward pair of collapsed linkages 30a, 30b to move the latter to their rigid straight-line or noncollapsed, supporting position. This latter movement also effects simultaneous rearward movement in the pair of main operating rods 31 and the rearward pair of linkages 30a and 30b by virtue of the formers' attachment between said forward pair of linkages 30a, 30b and said rearward pair of linkages 30a and 30b. Movement of the plurality of linkages 30a and 30b to their rigid, straight-line or noncollapsed, supporting position forces the base members 24 attached thereto downwardly to the floor-engaging position as clearly illustrated in Fig. 9 of the drawings, for example. The base members 24 of the friction floor bearing mechanism 11 are positively held or locked in said floor engaging position because of the "off-center" relation resulting from the actuation of foot pedals 12 between the pivot of said foot pedals 12 and the pivot between the operating rod clevis 32a and link 33 as clearly seen in Fig. 6 of the drawings. In order to retract the friction floor bearing mechanism 11, it is necessary only to reverse the above operation by operating either foot pedal 12 in the opposite direction to break the rigid, straight-line position of said linkages 30a and 30b at which point said mechanism 11 will continue its substantially vertical movement into its fully raised position with the weight of dolly 1 assisting in said movement.

Specifically referring to Figs. 2, 3, 7 and 8 of the drawings, means are illustrated for connecting the dolly 1 to a second dolly in chain-fashion when it is desired to utilize the invention as a conveyor. Said means includes a U-shaped connecting link 35 having a pair of elongated legs 35a, a base portion 35b, and a foot-pedal 36 incorporated therein and extending between said elongated legs 35a. Said legs 35a are pivoted as shown in Figs. 3 and 7 to a pair of upstanding projections 37a integral with base plate 37 for pivotal movement about a horizontal axis. Said connecting link 35 is mounted so that elongated legs 35a extend through said respective slots 3c (see Fig. 5) in said rear end 3. In order to retain said connecting link 35 in substantially horizontal position, a locking spring 38 is utilized, which locking spring 38 is mounted to engage with the bottom surfaces of elongated legs 35a. As seen clearly in Fig. 8 of the drawings, front nose element 23 incorporates a relatively large cutout portion 23b on the bottom edge thereof into which cutout portion 23b the U-shaped connecting link 35 is inserted when it is desired to connect two dollies together. In addition, a slot 23c is utilized in front nose element 23 to receive the depending support for foot pedal 36. Immediately to the rear of said slot 23c is a latch member 39 having a cam surface 39a which cam surface 39a makes contact with the base portion 35b of connecting link 35 as the two dollies are moved together. Said base portion 35b is moved inwardly until the bottom edge of said latch member 39 is cleared, at which point, connecting link 35 is snapped upwardly under action of locking spring 38 into the latched or connected position. When it is desired to disengage the two dollies, it is necessary only to apply pressure to foot pedal 36 to pivot connecting link 35 downwardly against the action of locking spring 38 and thereby disengage the latching connection between the base portion 35b thereof and the latch member 39, at which time said dollies may be moved apart.

To summarize the operation of the mechanism of the present invention, the dolly-conveyor may be interchangeably utilized either as a dolly or as a conveyor when desired. It may be utilized as a dolly by actuating either foot pedal 12 to "break" the clevis-type linkages 30a, 30b from their rigid, straight-line or noncollapsed supporting position through means of the main operating rods 31 and actuating bars 32 attached therebetween to thereby raise or retract the friction floor bearing mechanism 11 and thus actuate the lower pairs of rollers 10 and 40 and swivel casters 9 to their floor-engaging position. Said dolly may also be utilized as a conveyor through the very simple operation of raising the plurality of upper or top rollers 8 to their uppermost position by means of the operation of the pedal 19 to rotate main operating bar 18 which, in turn, pivots connecting links 17 to operate the members 13 and thereby raise roller supporting frames 7 and top rollers 8 mounted therein. To complete the change to a conveyor, a second dolly is connected to the first dolly by means of the spring-pressed connecting link 35 in a manner previously described.

Referring again to Figs. 2 and 4 of the drawings, it is noted that a pair of relatively small swivel casters 9 are shown mounted on the bottom side of dolly 1 adjacent the opposite sides of the rear end 3 thereof. Said lower rollers 10 are mounted in the frame of dolly 1 at a somewhat lower position than either lower rollers 40 or caster 9, which arrangement enables full and complete steering thereof by allowing pivotal movement on rollers 10. Since the latter are divided into a pair separated in the middle thereof, dolly 1 may be turned in its own length.

Thus, a new and yet unique device has been developed in the present invention in which its use as a dolly or conveyor is facilitated by means of a simple and improved actuation system for rapidly and easily interchanging the utilization thereof from a dolly to a conveyor and vice-versa.

I claim:

1. A combination dolly-conveyor comprising an open frame having a pair of spaced and parallel elongated, side walls, a front end piece slanting downwardly towards the front, a rear end opened towards the front end, an upper cross brace extending at an intermediate position between said side walls, a top roller frame movably mounted on each side of said upper cross brace having a plurality of depending supports each incorporating an indentation, a plurality of top rollers mounted in said top roller frames, a pair of bottom swivel casters mounted in said frame adjacent said rear end, a pair of bottom rollers mounted in depending relation to said cross brace parallel to said pair of swivel casters, an elongated bottom roller mounted in said frame adjacent said front end, first means for raising said roller frames and the top rollers mounted therein upwardly to an exposed position comprising a pair of spaced parallel main operating bars having a plurality of spaced upstanding projections each incorporating an upper rounded surface in complemental, releasable supporting engagement with the indentations of said roller-frame depending supports, and means actuating said pair of main operating bars between a roller-frame lowermost position and a roller-frame uppermost position comprising a bifurcated relatively short, interconnecting member pivotally attached at its bifurcated end to one end of said pair of operating bars and a pedal-actuated, relatively elongated member extending in transverse relation to said pair of main operating bars in fixed engagement with the ends of said bifurcated member remote from its attachment to said pair of main operating bars, and second means activating said bottom rollers and said casters to a floor-engaging position.

2. A combination dolly-conveyor as in claim 1, said second means comprising a friction floor bearing mechanism movable relative to said bottom rollers and said casters, said friction floor bearing mechanism being retractable from a floor-engaging position to an upper retracted position and comprising a pair of parallel main support elongated base members braced together and each incorporating a pair of elongated guide strips on the upper surface thereof, a pair of upright supports affixed on each side of said guide strips, a pair of spaced upright support brackets affixed on the side walls of said open frame adjacent each base member between said pair of upright supports supporting said friction floor bearing mechanism to said frame, and a double clevis-type linkage attached between each of said support brackets and said base members and pivotal between a lower rigid straight line, floor-engaging position and an upper retracted position.

3. Mechanism for carrying heavy objects comprising a dolly consisting of an open, main support, a plurality of upper rollers rotatably positioned in said support and mounted for movement between an upper exposed position and a lower inactivated position, means for moving said plurality of upper rollers between an upper and a lower position comprising a pair of relatively elongated, spaced actuating members extending interiorly of said main support in parallel relation to each other in movable engagement with said upper rollers in one position thereof, a pair of relatively short interconnecting elements pivotally attached at one end to one end of each of said actuating members and a pedal-operated bar extending transversely of said actuating members and rigidly attached to the other ends of said interconnecting elements to move said actuating members and said plurality of upper rollers in movable engagement therewith between an upper and a lower position, a plurality of fixed, lower rollers and swivel means mounted in said main support, and means movable between a lower-engaging position and a raised position for activating said lower rollers, said last-named means comprising an open frame having two spaced-apart parallel side braces and a pair of spaced cross braces extending therebetween, a plurality of brackets affixed in depending relation to said main support, a break-type linkage pivotally attached between each of said brackets and the upper surface of said side braces to move said side braces between an upper retracted position and a lower, load-supporting position, and common actuating means operable between two positions to break said linkages to retract said frame to an upper position.

4. A dolly for carrying heavy objects consisting of an open framework having side and end walls, a support brace extending between said side walls, a roller frame positioned between said side walls on opposite sides of said support brace and having a plurality of upper rollers revolvably positioned therein, an elongated operating rod extending beneath said roller frames on opposite sides thereof and having a plurality of upstanding projections along the upper surface thereof, said roller frames having a plurality of indentations along the lower surfaces thereof complementary to and engaged with said plurality of upstanding projections when said elongated operating rods are in an upper position, means moving said operating rods to said upper position, said means comprising a pedal actuated member pivotally mounted in one of the end walls of said dolly and a connecting link between the rear end of each operating rod and opposite ends of said pedal actuated member translating pivotal movement of the latter member to said operating rods to raise said upper rollers to an exposed position above the top level of said open framework, a first pair of lower rollers mounted in depending relation from said support brace, an elongated lower roller mounted in the front end wall, a pair of casters mounted for swivel movement in the rear end wall of said dolly, and means activating said lower rollers and said casters, said means consisting of a friction floor bearing device movable between a floor-engaging position and a raised roller-activating position, and pedal-operated means for moving said device between said positions.

5. A dolly for carrying heavy objects as in claim 4, said last-named means consisting of a plurality of pairs of oppositely disposed brackets depending from the side walls of said open framework, a double clevis-type linkage between said depending brackets and said friction floor bearing device, a pair of oppositely disposed brackets depending from the side walls of said open framework, a pair of oppositely disposed actuating members pivoted to the double clevis-type linkages of one of said plurality of pairs of brackets, a pair of connecting elements between the pivot of said actuating members to one of said pairs of brackets and the double clevis-type linkages of the other of said pairs of brackets, a pair of oppositely disposed links pivotally attached to one end of said pair of actuating members, a pair of foot pedals affixed to the opposite ends of said links, and a common operating member between said pair of foot pedals simultaneously operating said pair of oppositely disposed links to raise and lower said friction floor bearing device on operation of either of said foot pedals.

References Cited in the file of this patent

UNITED STATES PATENTS

| | | |
|---|---|---|
| 751,692 | Semm | Feb. 9, 1904 |
| 1,154,370 | Burke | Sept. 21, 1915 |
| 2,586,485 | Schroeder | Feb. 19, 1952 |
| 2,600,747 | Faust | June 17, 1952 |
| 2,693,286 | Cocks | Nov. 2, 1954 |
| 2,813,642 | Fisher | Nov. 19, 1957 |